No. 738,366. PATENTED SEPT. 8, 1903.
T. W. SMALL.
STREET INDICATING DEVICE.
APPLICATION FILED JUNE 7, 1902.
NO MODEL. 2 SHEETS—SHEET 1.

Witnesses.
E. B. Gilchrist
H. M. Wise

Inventor:
Thomas W. Small,
By his Attorneys,
Thurston & Bates

No. 738,366. PATENTED SEPT. 8, 1903.
T. W. SMALL.
STREET INDICATING DEVICE.
APPLICATION FILED JUNE 7, 1902.
NO MODEL. 2 SHEETS—SHEET 2.

Witnesses.
E. B. Gilchrist
H. M. Wise

Inventor,
Thomas W. Small,
By his Attorneys,
Thurston & Bates.

No. 738,366.

Patented September 8, 1903.

UNITED STATES PATENT OFFICE.

THOMAS W. SMALL, OF CLEVELAND, OHIO, ASSIGNOR TO PETER SMALL, OF CLEVELAND, OHIO.

STREET-INDICATING DEVICE.

SPECIFICATION forming part of Letters Patent No. 738,366, dated September 8, 1903.

Application filed June 7, 1902. Serial No. 110,590. (No model.)

*To all whom it may concern:*

Be it known that I, THOMAS W. SMALL, a citizen of the United States, residing at Cleveland, in the county of Cuyahoga and State of Ohio, have invented a certain new and useful Improvement in Street-Indicating Devices, of which the following is a full, clear, and exact description, reference being had to the accompanying drawings.

The object of this invention is to provide an efficient street-indicator for cars and similar uses.

My indicator is actuated electrically and may be very conveniently connected with any suitable contact-making device, which latter may, for example, be carried by the trolley, thus causing the indicator to be automatically operated.

My indicator includes a band having the different designations upon it, as the names of streets or stops, rollers for guiding the band, spring arrangements for keeping the band taut, a clockwork for driving the band, and mechanism for releasing the clockwork as desired.

The invention comprises also the more particular embodiment of these features with an electromagnetic releasing device, as hereinafter more fully explained.

The drawings clearly illustrate my invention.

Figure 1:
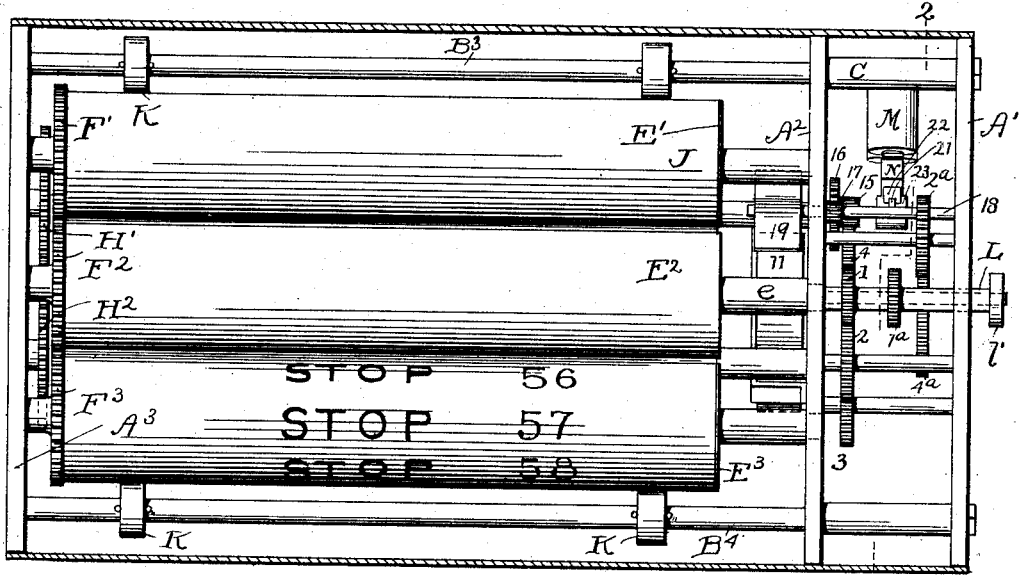
Figure 2:
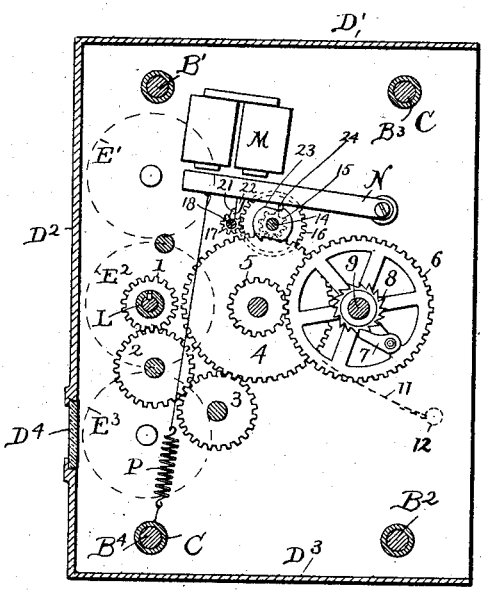
Figure 3:
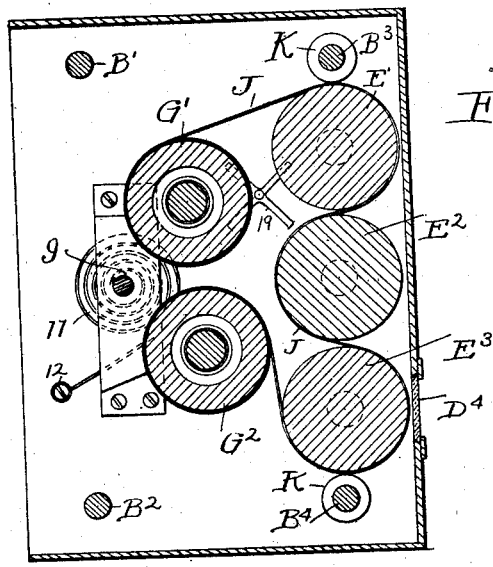
Figure 4:
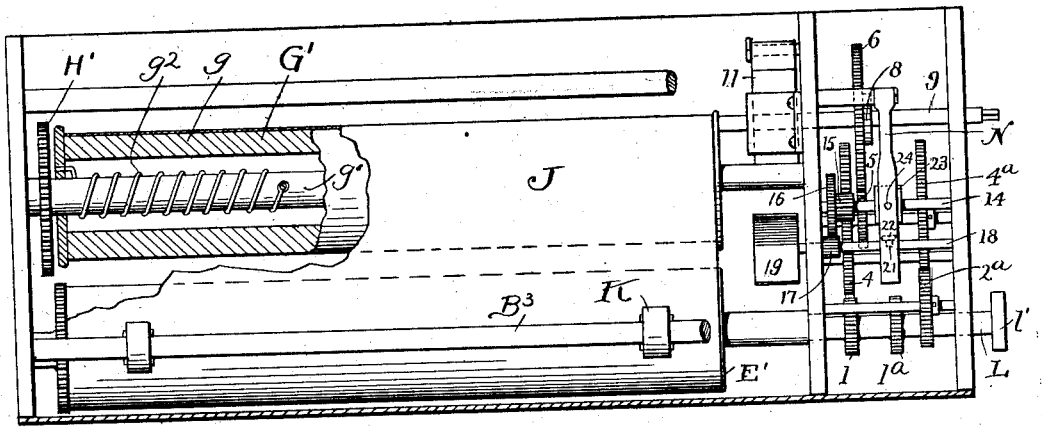

Figure 1 is a side elevation of the invention with the front of the casing removed. Fig. 2 is a cross-section of Fig. 1 on the line 2 2 thereof looking toward the left. Fig. 3 is a cross-section of Fig. 1 looking toward the right. Fig. 4 is a plan with the upper part of the casing removed and one of the spring-barrels broken away to show the interior.

The frame of the indicator consists, as shown, of three cross-plates $A'$, $A^2$, and $A^3$, held together by rods, of which four are shown, $B'$, $B^2$, $B^3$, and $B^4$. On these rods between the plates $A'$ and $A^2$ are distance-sleeves C. Carried by the end plates $A'$ and $A^2$, and with them forming a casing, is the top plate $D'$, the front plate $D^2$, and the bottom plate $D^3$, which may all be a single plate of metal. In the front plate is an opening carrying, preferably, a piece of glass $D^4$, through which the street-designations are observed.

Mounted on the cross-plates $A^2$ and $A^3$ are three rollers, (designated $E'$, $E^2$, and $E^3$). These rollers are all geared together by the gears $F'$, $F^2$, and $F^3$, which they respectively carry. At the rear of these rollers are a pair of rollers (designated $G'$ and $G^2$). These rollers are also mounted in the frame-plates $A^2$ and $A^3$, and they are geared together by the gears $H'$ and $H^2$, but are not geared with the rollers $E'$, $E^2$, and $E^3$.

The rollers $G'$ and $G^2$ are spring-barrels, consisting, as shown in Fig. 4, of an outer tubular barrel $g$, loosely surrounding a shaft $g'$ and connected therewith by a helical spring $g^2$. The springs in the two rollers $G'$ and $G^2$ are wound in the same direction, which, as shown in the drawings, gives these rollers a tendency to turn in the left-hand direction. The shafts $g'$ of the rollers are rotatably mounted in the frame-plates $A^2$ and $A^3$ and carry the gears $H'$ and $H^2$, by which the rollers are connected. Thus if either of these rollers is rotated the other is driven thereby correspondingly, while each has an independent play, due to the spring connection of the barrel with the shaft.

J represents the roll of paper or other flexible material on which the street-designations or other signs are printed. This roll is secured at its ends to the two rollers $G'$ and $G^2$ and passes off the upper sides of these rollers around the front of the outer rollers E and $E^3$ and the back of the intermediate roller $E^2$. The springs $g^2$ keeping the band taut at all times, it follows that if the roller $E^2$ is rotated it will drive the band J in one direction or the other, causing it to play off of the roller $G'$ or $G^2$, as the case may be, and the rotation thereby given to that roller will be communicated to its mate through the gearing $H'$ and $H^2$ to take up the band at the other end. The spring connection between the barrels of the rollers $G'$ and $G^2$ and their shafts maintains the strip taut at all times notwithstanding the diminution in the effective size of one roller and the increase in the other, due to the winding off and on of the strip, respectively. Suitable rollers K, mounted on the rods $B^3$ $B^4$, also serve to hold the paper snugly on the rollers $E'$ $E^3$. Now the different designations to be exposed being printed on the strip J, (those shown in the drawings being "stop" 56, &c.,) if the roller E² is given a sufficient rotation one designation is moved away from the sight-opening D⁴ and the next moved into position behind the opening, as desired.

The driving-roller E² is rigid on its shaft e, by which it may be driven. This shaft extends across from the plate A² to the plate A'. It is surrounded by a sleeve L, which is splined to it, but may be shifted on it to change the direction of rotation, as about to be explained.

On the sleeve L are rigidly mounted a pair of gears (designated 1 and 1ª.) As shown in the drawings, the gear 1 meshes with an idle gear 2, which meshes with an idler 3, which in turn meshes with a gear 4, which is rigid with a pinion 5, which meshes with a gear 6, which carries a pawl 7, engaging a ratchet-wheel 8 around the shaft 9, on which is wound the spiral spring 11, one end being secured to the shaft and the other end to a stationary point, as 12. Thus the spring being wound up and allowed to unwind through this train of gearing drives the roller E² in a given direction.

If the sleeve L is drawn outward, as it may easily be from the outside, by the head 1', which it carries, the gear 1 is drawn out of mesh with the idler 2 and the gear 1ª is drawn into mesh with the idler 2ª, which meshes with the gear 4ª of the same size as the gear 4 and rigid with it. This connection simply eliminates one of the gears in the train between the shaft e and the driving-gear 6 and causes the same movement of the gear 6 to drive the strip in the opposite direction.

In order to govern the release of the clockwork as desired, I provide a shaft 14, having rigid on it a pinion 15, meshing with the gear 4, and a gear 16, engaging another pinion 17 on a shaft 18, which carries a fan 19. On the shaft 18 is a lug 21, adapted to be engaged by a lug 22 on a pivoted lever N, which constitutes the armature for the electromagnet M. A spring P tends to draw the armature away from the magnet into position to cause the lug 22 to stand in the path of the lug 21, and thereby prevent the rotation of the shaft 18 and block the whole train of gears. On the shaft 14 is a collar 23, recessed to receive a pin 24 on the lever N. If, however, the periphery of the collar should engage this pin 24, it would hold the lug 22 out of the path of the lug 21 and allow the rotation of the train of gears. Now when it is desired to move the band J to give a new designation the magnet M is simply energized. This raises the armature and draws the lug 22 out of engagement with the lug 21, releasing the train of gearing, whereupon the latter drives the band in the direction predetermined by the position of the sleeve L.

The energization of the magnet is of course of very short duration; but before the armature N can drop back into place the periphery of the collar 23 has engaged the end surface of the pin 24 and holds the armature up, with the lug 22 idle. The proportioning of the parts is such that as the next indication on the strip J comes into view position a recess on the collar 23 comes beneath the pin 24, allowing the armature to descend and the pin 22 to come into position to stop the shaft 18 and thereby the whole train of gearing. The fan 19 is for the purpose of rendering the rotation of the gearing comparatively regular and prevent it unduly racing when there is the greatest tension on the driving-spring. The spring is wound up from outside the casing by a suitable key engaging the squared end of the shaft 9.

One winding of the spring may easily be sufficient to drive the band J throughout its entire length. Hence it is simply necessary for the conductor of the car to wind up the spring and shift the sleeve L at the end of each trip, this being no more work than setting of the fare-register in common use. Any suitable means for closing the electric circuit through the magnet M may be employed. The circuit-closer may be a push-button on the car, or it may be a device carried by the car and automatically engaged at points along the track, as by suitable stops carried by the trolley-wire.

I claim—

1. In an indicating device, the combination of a pair of rollers, shafts therefor geared together, springs connecting the shafts with the rollers, an indicating-band winding off one roller and onto the other, and an intermediate roller in engagement with which said band passes, said intermediate roller being independent of the gearing of the rollers first mentioned, and means for rotating said intermediate roller to drive the band, substantially as described.

2. In an indicating device, the combination of a pair of rollers, shafts therefor geared together, springs connecting the shafts with the rollers, an indicating-band winding off one roller and onto the other, and three other rollers, the band passing from the spring-rollers unto the forward side of the extreme two of said rollers and unto the rear side of the intermediate roller, a casing having a sight-opening adjacent to one of said extreme rollers, and means for rotating one of said three rollers to drive the band, substantially as described.

In testimony whereof I hereunto affix my signature in the presence of two witnesses.

THOMAS W. SMALL.

Witnesses:
ALBERT H. BATES,
H. M. WISE.